United States Patent
Jin et al.

(10) Patent No.: US 12,424,395 B2
(45) Date of Patent: Sep. 23, 2025

(54) DEGASSING MEMBRANE TUBE MODULE AND ONLINE GAS-IN-OIL MONITORING APPARATUS FOR VACUUM ON-LOAD TAP CHANGER (OLTC)

(71) Applicant: State Grid Hubei Electric Power Research Institute, Hubei (CN)

(72) Inventors: Lei Jin, Hubei (CN); Kai Zhou, Hubei (CN); Wei Luo, Hubei (CN); Fei Lu, Hubei (CN); Rui Liu, Hubei (CN); Wei Wang, Hubei (CN); Hong Zhang, Hubei (CN); Yu Zhang, Hubei (CN); Yalong Tu, Hubei (CN)

(73) Assignee: State Grid Hubei Electric Power Research Institute, Wuhan (CN)

( * ) Notice: Subject to any disclaimer, the term of this patent is extended or adjusted under 35 U.S.C. 154(b) by 250 days.

(21) Appl. No.: 18/206,626

(22) Filed: Jun. 7, 2023

(65) Prior Publication Data
US 2023/0317381 A1    Oct. 5, 2023

Related U.S. Application Data (63) Continuation of application No. PCT/CN2022/101701, filed on Jun. 28, 2022.

(30) Foreign Application Priority Data

Dec. 17, 2021    (CN) .......................... 202111555444.8

(51) Int. Cl.
     *H01H 9/00*      (2006.01)
(52) U.S. Cl.
     CPC ........ *H01H 9/0038* (2013.01); *H01H 9/0027* (2013.01); *H01H 2009/0061* (2013.01)

(58) Field of Classification Search
     CPC ............... H01H 9/0038; H01H 9/0027; H01H 2009/0061; H01H 33/57; B01D 19/0031;
(Continued)

(56) References Cited

U.S. PATENT DOCUMENTS

| | | | |
|---|---|---|---|
| 6,217,634 B1 | 4/2001 | Dominelli et al. | |
| 6,582,496 B1 * | 6/2003 | Cheng .................. | B01D 63/033 96/6 |

(Continued)

FOREIGN PATENT DOCUMENTS

| | | | | |
|---|---|---|---|---|
| CN | 101239256 A | | 8/2008 | |
| CN | 213398164 | * | 6/2021 | ............... G01N 1/14 |
| CN | 113324816 A | | 8/2021 | |

OTHER PUBLICATIONS

Translation of CN213398164 (Original document published Jun. 8, 2021) (Year: 2021).*

(Continued)

*Primary Examiner* — William A Bolton (57) ABSTRACT

The present disclosure provides a degassing membrane tube module and an online gas-in-oil monitoring apparatus for a vacuum on-load tap changer (OLTC). The online gas-in-oil monitoring apparatus includes an online monitoring housing, an oil inlet tube, a gas monitoring device, an oil tank, and an oil diffusing screen, where one end of the oil inlet tube extends through an inner wall at one side of the online monitoring housing; the gas monitoring device is located on a top inner wall of the online monitoring housing; and a front end of the oil inlet tube is provided with the degassing membrane tube module for online preliminary degassing on insulating oil. With the degassing membrane tube module, the online gas-in-oil monitoring apparatus can increase removal rates for gases in the insulating oil within a short time, and can perform degassing on various gases in the insulating oil.

8 Claims, 10 Drawing Sheets

(58) Field of Classification Search
CPC ..... B01D 19/0063; B01D 53/22; H01F 27/14; G01N 30/02; G01R 1/0408; G01R 31/62
USPC ............. 200/61.3, 61.03, 61.08; 95/46; 96/6
See application file for complete search history.

(56) References Cited

U.S. PATENT DOCUMENTS

| | | | | |
|---|---|---|---|---|
| 7,166,147 | B2* | 1/2007 | Vesper | B01D 19/0031 96/6 |
| 8,038,770 | B2* | 10/2011 | Hummelt | B01D 19/0031 95/266 |
| 8,906,143 | B2* | 12/2014 | Lokhandwala | B01D 63/10 55/342 |
| 8,979,977 | B2* | 3/2015 | Walter | B01D 61/025 96/417 |
| 9,452,251 | B2* | 9/2016 | Meyer | A61M 1/1658 |
| 2015/0053083 | A1* | 2/2015 | Taylor | B01D 19/0031 96/6 |
| 2020/0164286 | A1* | 5/2020 | Sims | B01D 19/0063 |

OTHER PUBLICATIONS

Translation of CN113324816 (Original document published Aug. 31, 2021) (Year: 2021).*

* cited by examiner

DEGASSING MEMBRANE TUBE MODULE AND ONLINE GAS-IN-OIL MONITORING APPARATUS FOR VACUUM ON-LOAD TAP CHANGER (OLTC)

CROSS REFERENCE TO RELATED APPLICATIONS

The present application is a Continuation Application of PCT Application No. PCT/CN2022/101701 filed on Jun. 28, 2022, which claims the benefit of Chinese Patent Application No. 202111555444.8 filed on Dec. 17, 2021. All the above are hereby incorporated by reference in their entirety.

TECHNICAL FIELD

The present disclosure relates to the technical field of power device monitoring, and in particular to an online gas-in-oil monitoring apparatus for a vacuum on-load tap changer (OLTC) based on membrane degassing.

BACKGROUND

Transformers are essential devices in a power system, and their operational reliabilities have a direct influence on safety and stability of the power system. Insulation faults that developed in a transformer are effectively associated with compositions and contents of dissolved gases in transformer oil. Hence, dissolved gas analysis (DGA) on the transformer oil has become an effective monitoring method of the power system to diagnose faults of oil-immersed power devices.

However, the commonly used oil chromatography online monitoring apparatus is mainly intended to monitor contents of dissolved gases in transformer oil, the gases includes hydrogen ($H_2$), acetylene ($C_2H_2$), carbon monoxide (CO), carbon dioxide ($CO_2$), methane ($CH_4$), ethane ($C_2H_6$), and ethylene ($C_2H_4$). The apparatus includes a degassing module and a gas detection module. Specifically, insulating oil is fed to the degassing module through an oil tube. And dissolved gases separated from the oil are fed to the gas detection module for content determination. Such an apparatus is not suitable for online monitoring of a vacuum OLTC due to a large size, high oil consumption, a complex structure, and a high cost. An online monitoring apparatus for the vacuum OLTC requires characteristics of a small size, low oil consumption, and a low cost.

SUMMARY

An objective of the present disclosure is to provide an online gas-in-oil monitoring apparatus for a vacuum OLTC based on membrane degassing, to overcome defects in the prior art. By providing a degassing membrane tube module at a front end of an oil inlet tube to perform online preliminary degassing on insulating oil, the present disclosure can increase removal rates for gases in the insulating oil within a short time, can perform the degassing on various gases in the insulating oil, and facilitates miniaturization of the apparatus, with low oil consumption and a low cost.

To achieve the above-mentioned objective, the present disclosure provides a degassing membrane tube module, which is provided at a front end of an oil inlet tube to perform online preliminary degassing on insulating oil, and includes an oil inlet and an oil outlet at two ends of the degassing membrane tube module, where an oil-gas separation membrane tube and a housing sleeved on the oil-gas separation membrane tube are provided between the oil inlet and the oil outlet; and a gas inlet and a gas outlet are threadedly connected to an outer wall of the housing; and a cavity enclosed by the oil inlet, the oil outlet and the oil-gas separation membrane tube forms an oil chamber where the insulating oil flows; and a certain gap is reserved between the oil-gas separation membrane tube and the housing to form a gas chamber, such that gases separated from the insulating oil through the oil-gas separation membrane tube can be guided out, and exhausted by the gas outlet.

The present disclosure further provides an online gas-in-oil monitoring apparatus for a vacuum OLTC, including an online monitoring housing, an oil inlet tube, a gas monitoring device, and an oil tank, where a front end of the oil inlet tube is provided with the degassing membrane tube module, so as to perform online preliminary degassing on insulating oil.

Preferably, one end of the oil inlet tube may extend through an inner wall at one side of the online monitoring housing; the gas monitoring device may be located on a top inner wall of the online monitoring housing; the oil tank may be located in the online monitoring housing; an oil diffusing screen may be provided at a top of the oil tank; a support plate may be provided in the online monitoring housing; the support plate may be located below the oil tank; the support plate may be fixedly connected to inner walls of the online monitoring housing; an oil discharge tube may be provided at one side of the online monitoring housing; a support ring may be provided above the support plate; a bottom of the support ring may be fixedly connected to two threaded tubes; a vertical teetering mechanism may be provided at bottoms of the threaded tubes; and the threaded tubes may be connected to the oil tank through a horizontal striking component.

Preferably, the horizontal striking component may include connecting rods symmetrically provided at two sides of the support ring; bottoms of the connecting rods may be connected to the threaded tubes through support rods; a top of each of the connecting rods may be fixedly connected to a toothed plate; a rotating shaft may be provided at one side of the toothed plate; a gear ring may be sleeved on the rotating shaft; the gear ring may be fixedly connected to the rotating shaft; two cams may be sleeved on the rotating shaft; the cams may be fixedly connected to the rotating shaft; the rotating shaft may be connected to the inner wall of the online monitoring housing through a support rotary piece; one side of the toothed plate may be connected to the inner wall of the online monitoring housing through a stabilizing mechanism; the oil tank may be connected to the support ring through an elastic support mechanism; a plurality of rollers may be arranged at a bottom of the oil tank; an oil discharge hole may be formed in the bottom of the oil tank; and an opening-closing mechanism may be provided at the bottom of the oil tank.

Preferably, the stabilizing mechanism may include a fixed plate at one side of the toothed plate; one side of the fixed plate may be connected to the inner wall of the online monitoring housing through two support posts; a chute may be formed in one side of the fixed plate; a side of the toothed plate closer to the fixed plate may be fixedly connected to a slider; the slider may be located in the chute; and both the chute and the slider may have a T-shaped cross section.

Preferably, the support rotary piece may include first support side plates symmetrically provided at two ends of the rotating shaft, one side of each of the first support side plates may be fixedly connected to the inner wall of the online monitoring housing, and two ends of the rotating shaft may be respectively connected to the two first support side plates through first bearings.

Preferably, the elastic support mechanism may include second support side plates symmetrically provided at two sides of the oil tank; one side of each of the second support side plates may be connected to the support ring through a connecting support plate; the second support side plates may be connected to the oil tank through buffer springs; and a bottom of each of the rollers may contact a top of the support ring.

Preferably, the opening-closing mechanism may include a fixed tube above the support plate; a top of the fixed tube may be fixedly connected to the bottom of the oil tank; an iron ring may be sleeved on the fixed tube; a top of the iron ring may be fixedly connected to the bottom of the oil tank; an electromagnet may be provided at a bottom of the iron ring; and the electromagnet may be connected to the oil tank through a pulling buffer piece.

Preferably, the pulling buffer piece may include a support disc below the electromagnet; a top of the support disk may be connected to the bottom of the oil tank through a plurality of connecting posts; a bottom of the electromagnet may be connected to the top of the support disk through a plurality of tensile springs; a bottom of the fixed tube may be fixedly connected to a seal ring; and a bottom of the seal ring may contact a top of the electromagnet.

Preferably, the vertical teetering mechanism may include threaded posts in the threaded tubes; the threaded posts each may extend through the support plate; second bearings may be provided at places where the threaded posts may extend through the support plate; and bottom ends of the threaded posts may be connected to a bottom inner wall of the online monitoring housing through third bearings.

Preferably, a worm may be provided below the support plate; the worm may include one end connected to an inner wall at one side of the online monitoring housing through a fourth bearing, and the other end connected to an inner wall at another side of the online monitoring housing through a drive motor; a worm wheel may be sleeved on each of the threaded posts; and the worm wheel may be engaged with the worm.

The present disclosure achieves the following beneficial effects over the prior art:

1. By providing the degassing membrane tube module at the front end of the oil inlet tube to perform the online preliminary degassing on the insulating oil, the present disclosure can increase removal rates for gases in the insulating oil within a short time, can perform the degassing on various gases in the insulating oil, and facilitates miniaturization of the apparatus, with low oil consumption and a low cost.
2. When the online gas-in-oil monitoring apparatus works, with the support ring, the threaded tubes and the vertical teetering mechanism, the drive motor drives the worm to rotate. Through engagement between the worm and the worm wheel, the threaded posts rotate. By changing lengths of the threaded posts in the threaded tubes, heights of the threaded tubes can be adjusted. By periodically driving the worm to rotate normally and reversely, the threaded tubes can teeter up and down relative to the support plate, and therefore, the support ring and the oil tank teeter up and down.
3. With the oil tank, the support ring, the threaded tubes, the connecting rods, the support rods, the toothed plate, the rotating shaft, the gear ring, the cams, the support rotary piece and the elastic support mechanism, the oil tank is elastically connected relative to the support ring. When the threaded tubes drive the connecting rods and the support rods to move up and down, the toothed plate moves up and down. As a result, through engagement between the gear ring and the toothed plate, the rotating shaft rotates, the cams swing left and right, and the cams strike the oil tank periodically. While the oil tank teeters up and down, the oil tank shakes horizontally to achieve a more desirable vibration effect of the oil.
4. With the fixed plate, the support posts, the chute and the slider, when the toothed plate moves up and down, the slider slides in the chute. With cooperation between the chute and the slider, the toothed plate moves up and down stably, and there are no inclination and teetering when the toothed plate moves up and down.
5. With the opening-closing mechanism, when there is a need to discharge the oil in the oil tank, the electromagnet is turned off, such that the electromagnet is not attracted with the iron ring. In this case, the tensile springs are stretched, and the tensile springs drive the electromagnet to move down, such that the electromagnet does not contact the bottom of the seal ring to open the fixed tube. Consequently, the oil in the oil tank flows out through the oil discharge hole and the fixed tube. The oil flows to the top of the support plate, and flows out of the online monitoring housing through the oil discharge tube. When there is a need to close the fixed tube, the electromagnet is turned on, such that the electromagnet is attracted with the iron ring through a magnetic force, and the tensile springs are stretched. Consequently, the electromagnet contacts the seal ring to close the fixed tube.

BRIEF DESCRIPTION OF THE DRAWINGS

The drawings are provided for further understanding of the present disclosure and constitute a part of the specification. The drawings, together with the embodiments of the present disclosure, are intended to explain the present disclosure, rather than to limit the present disclosure.

In the drawings.

In the figures:
2: oil inlet tube, 201: oil inlet, 202: oil outlet, 203: gas inlet, 204: gas outlet, 205: fluorine rubber seal ring, 206: oil chamber, 207: housing, 208: gas chamber, 209: fluorine rubber seal ring, and 210: oil-gas separation membrane tube;
1: online monitoring housing, 3: gas monitoring device, 4: oil tank, 5: support plate, 6: oil discharge tube, 7: support ring, and 8: threaded tube;
90: horizontal striking component, 9: connecting rod, 10: support rod, 11: toothed plate, 12: rotating shaft, 13: gear ring, 14: cam, 15: oil diffusing screen, 16: roller, 17: oil discharge hole, and 18: fixed tube;
190: stabilizing mechanism, 19: fixed plate, 20: support post, 21: chute, and 22: slider;
230: support rotary piece, 23: first support side plate, and 24: first bearing;
250: elastic support mechanism, 25: second support side plate, 26: connecting support plate, and 27: buffer spring;
280: opening-closing mechanism, 28: iron ring, and 29: electromagnet;
300: pulling buffer piece, 30: support disk, 31: connecting post, 32: tensile spring, and 33: seal ring; and
340: vertical teetering mechanism, 34: threaded post, 35: second bearing, 36: third bearing, 37: worm wheel, 38: worm, 39: fourth bearing, and 40: drive motor.

DETAILED DESCRIPTION

The technical solutions in embodiments of the present disclosure will be described below clearly and completely with reference to the accompanying drawings in the embodiments of the present disclosure. Apparently, the described embodiments are merely a part rather than all of the embodiments of the present disclosure. All other embodiments derived from the embodiments in the present disclosure by those of ordinary skill in the art without creative work shall fall within the protection scope of the present disclosure.

Embodiment 1

Figure 1:
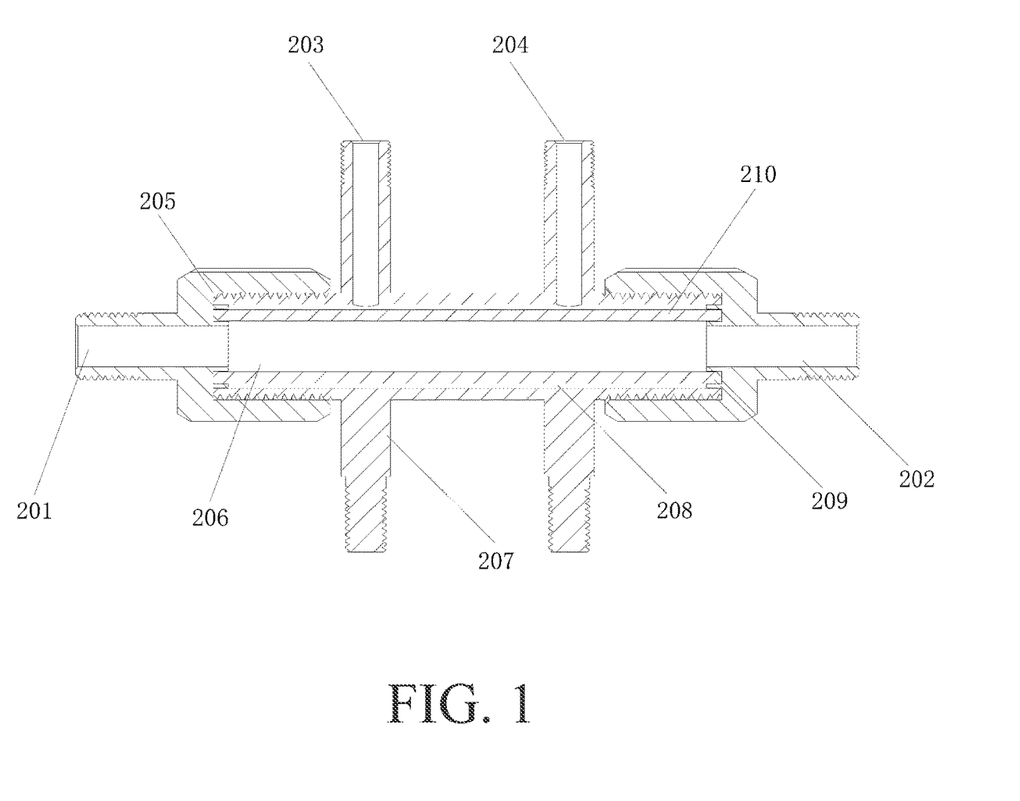
FIG. 1 is a schematic structural view of a degassing membrane tube module according to the present disclosure.

As shown in FIG. 1, the present disclosure provides a degassing membrane tube module, including an oil inlet 201 and an oil outlet 202 at two ends of the degassing membrane tube module. An oil-gas separation membrane tube 210 and a housing 207 sleeved on the oil-gas separation membrane tube 210 are provided between the oil inlet 201 and the oil outlet 202. A gas inlet 203 and a gas outlet 204 are threadedly connected to an outer wall of the housing 207.

A cavity enclosed by the oil inlet 201, the oil outlet 202 and the oil-gas separation membrane tube 210 forms an oil chamber 206 where insulating oil flows. A certain gap is reserved between the oil-gas separation membrane tube 210 and the housing 207 to form a gas chamber 208, such that gases separated from the insulating oil through the oil-gas separation membrane tube 210 can be guided out, and exhausted by the gas outlet 204.

The oil chamber 206 and the gas chamber 208 are separated apart through fluorine rubber seal rings 205, 209 and the oil-gas separation membrane tube 210.

Optionally, in specific use, the oil-gas separation membrane tube 210 takes an ultrafiltration, microfiltration or nanofiltration ceramic membrane tube as a support layer. A separation layer of the oil-gas separation membrane tube is made of a polymer with good oil resistance and gas permeability, namely the separation layer is a polymer membrane tube formed on a surface of the ceramic membrane tube by coating. As a result, a high strength of the ceramic membrane tube and a high gas permeability of the polymer membrane tube are combined together, and thus the degassing membrane tube module is fast in degassing speed, low in cost, and convenient in installation and use. In addition, the degassing membrane tube module may include a single oil-gas separation membrane tube, and may also be assembled with a plurality of the oil-gas separation membrane tubes.

The oil-gas separation membrane tube 210 is of an internal-compression structure, namely transformer oil enters from an inside of the membrane tube, and gases in the transformer oil are separated through the oil-gas separation membrane tube 210 to enter the gas chamber 208. The polymer material in the separation layer of the oil-gas separation membrane tube 210 is amorphous glassy perfluororesin, or a compound of the amorphous glassy perfluororesin and fully-hydrophobic nano silica powder. Silica in the amorphous glassy perfluororesin is 0.1-5% of the amorphous glassy perfluororesin by weight.

The separation layer of the oil-gas separation membrane tube 210 is made of a polymer material that has a good gas permeability and is suitable for coating, such as a Teflon AF series product from the Du-pont Company or a Hyflon AD series product from the Solvay Solexis Company. The thickness of the separation layer can be controlled by a concentration of a coating solution and a number of coating times, and is generally controlled at 0.1-10 μm.

The oil-gas separation membrane tube 210 is fabricated as follows:

The ceramic support layer is cleaned with a solution. A polymer material solution is poured into the oil-gas separation membrane tube having one end sealed temporarily, and poured out of the oil-gas separation membrane tube after 0.5-20 min, thereby completing once coating. The coating is performed for 1-10 times, the oil-gas separation membrane tube is heated for drying, and a solvent is removed to obtain an oil-gas separation ceramic composite membrane.

The polymer material solution has a concentration of 0.1-10 wt %. The number of coating times changes over the concentration of the polymer material solution, namely the number of coating times increases correspondingly with a decrease in the concentration of the polymer material solution, and vice versa. In order to improve a binding force between the ceramic support layer and the polymer separation layer during fabrication, after the ceramic support layer is cleaned, a ceramic surface is preferably treated with a silane or fluorosilane substance. Preferably, surface treatment is performed on the separation layer of the ceramic composite membrane with energetic particles and plasmas, so as to improve the oil resistance and gas permeability of the oil-gas separation ceramic composite membrane.

An internal-compression ceramic membrane tube having an aperture of 50 nm is selected as the oil-gas separation membrane tube 210. The ceramic membrane tube has an inner diameter of 10 mm, an outer diameter of 12.5 mm, and a length of 100 mm, and is cleaned with an ethanol solution.

The Teflon AF2400 solution produced by the Du-pont Company and having a concentration of 1.0 wt % is selected as the polymer material solution to prepare the separation layer. The polymer material solution is poured into the oil-gas separation membrane tube having one end sealed temporarily, and poured out after 0.5 min, thereby completing once coating. The coating is performed for 7 times repeatedly, the oil-gas separation membrane tube is heated to 200° C. for drying, and a solvent is removed. From a cross-sectional image of a scanning electron microscope (SEM), it can be determined that the separation layer has a thickness of about 5 m.

During fabrication, one fluorine rubber seal ring is put into a housing of the oil inlet 201. The housing 207 and the oil-gas separation membrane tube 210 are vertically inserted. The other fluorine rubber seal ring is sleeved to preliminarily fix the oil-gas separation membrane tube 210 and the housing 207. The oil outlet 202 is finally fixed on the housing 207, thereby fabricating one degassing membrane tube module. The oil chamber 206 and the gas chamber 208 in the degassing membrane tube module are isolated completely by the oil-gas separation membrane tube 210 and the fluorine rubber seal rings 205, 209. Gases in the oil in the oil inlet and oil outlet 201, 202 can only permeate to the gas chamber 208 through the oil-gas separation membrane tube 210.

Detection of the Degassing Membrane Tube Module
(1) Seal Test on the Degassing Membrane Tube Module The gas inlet 203, the gas outlet 204 and the oil inlet 201 each are blocked by a special plug. A gas bottle with a pressure gauge is used to apply a pressure of 0.1 Mpa to the oil outlet 202 of the degassing membrane tube module. After 15 min, whether the pressure gauge has a pressure drop is observed. Any pressure drop indicates that the degassing membrane tube module suffers gas leakage at the fluorine rubber seal rings 205, 209 and needs to be remounted to pass the Seal Test, Namely there is No Pressure Drop of the Pressure Gauge During the Test.

(2) Dielectric Withstanding Voltage (DWV) Test on the Degassing Membrane Tube Module After the degassing membrane tube module passes through the seal test, the oil inlet 201 is blocked by the special plug, and the gas bottle with the pressure gauge is used to apply a pressure of 0.3 Mpa to the oil outlet 202 of the degassing membrane tube module. After 10 s, whether the pressure gauge has a pressure drop is observed. Any pressure drop indicates that the oil-gas separation membrane tube 210 in the degassing membrane tube module is damaged and Needs to be Replaced.

(3) Oil-Gas Isolation Test on the Degassing Membrane Tube Module

The oil chamber 206 of the degassing membrane tube module is fully filled with the transformer oil. The oil inlet 201 is blocked by the special plug, and the gas bottle with the pressure gauge is used to apply a pressure of 0.1 Mpa to the oil outlet 202 of the degassing membrane tube module. After 1 h, whether the gas inlet 203 and the gas outlet 204 suffer leakage of the transformer oil is observed. Any oil leakage indicates that the oil-gas separation membrane tube 210 in the degassing membrane tube module has an abnormal oil-gas isolation function, and needs to be replaced.

(4) Oil-Gas Separation Test on the Degassing Membrane Tube Module

The degassing membrane tube module is put into a degassing device to test oil-gas separation performance. The degassing device may be a Zhongfen 1081-II automatic degassing oscillator. All degassing membrane tube modules have different degassing efficiencies for the oil-gas separation membrane tubes 210. The oil-gas separation efficiency of each degassing membrane tube module is calibrated according to the actual test.

The degassing efficiency of the degassing membrane tube module is specifically tested as follows:

Test Method:

20 L of insulating oil was prepared. A Zhongfen 2000B transformer oil analyzing gas chromatograph was used to test an offline concentration of the insulating oil. The insulating oil should be prepared into a highly concentrated oil sample as much as possible. The highly concentrated oil sample is an oil sample having a gas concentration of more than 50 μL/L for the hydrogen ($H_2$), methane ($CH_4$), ethane ($C_2H_6$), ethylene ($C_2H_4$), and acetylene ($C_2H_2$). The OFS-DGA-01A membrane tube degassing model machine was used to set oil circulations (degassing time) of 1 h, 2 h, 4 h, 8 h, and 24 h. Degassing efficiencies of the hydrogen ($H_2$), methane ($CH_4$), ethane ($C_2H_6$), ethylene ($C_2H_4$), and acetylene ($C_2H_2$) in different degassing time were compared.

Test Data

| | Type of the gas | | | | |
|---|---|---|---|---|---|
| | $H_2$ | $CH_4$ | $C_2H_2$ | $C_2H_4$ | $C_2H_6$ |
| Offline concentration of insulating oil (μL/L) | 148.17 | 80.05 | 98.52 | 90.57 | 113.14 |
| 1 h Tested value (μL/L) | 104.3 | 56.34 | 72.35 | 63.78 | 85.57 |
| 2 h Tested value (μL/L) | 118.53 | 64.04 | 78.8 | 72.45 | 90.43 |
| 4 h Tested value (μL/L) | 137.79 | 68.04 | 83.74 | 76.98 | 96.08 |
| 8 h Tested value (μL/L) | 143.72 | 77.64 | 95.56 | 87.85 | 109.64 |
| 24 h Tested value (μL/L) | 149.65 | 80.85 | 100.49 | 91.47 | 116.43 |

Figure 2:
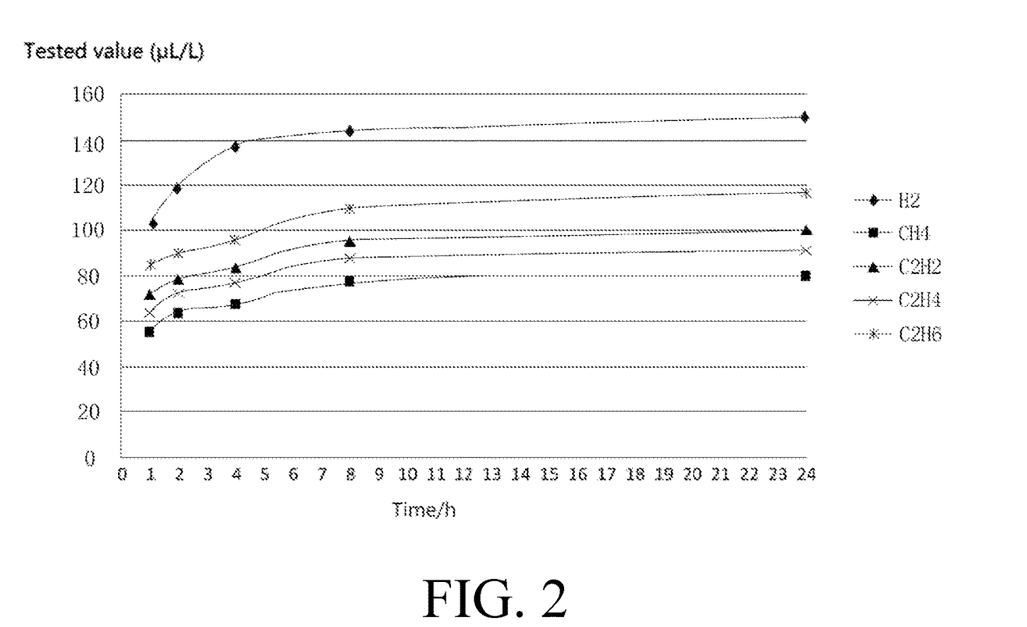
FIG. 2 is a curve graph showing that a degassing efficiency of a degassing membrane tube module on each of hydrogen ($H_2$), methane ($CH_4$), ethane ($C_2H_6$), ethylene ($C_2H_4$), and acetylene ($C_2H_2$) changes over time according to the present disclosure.
Figure 3:
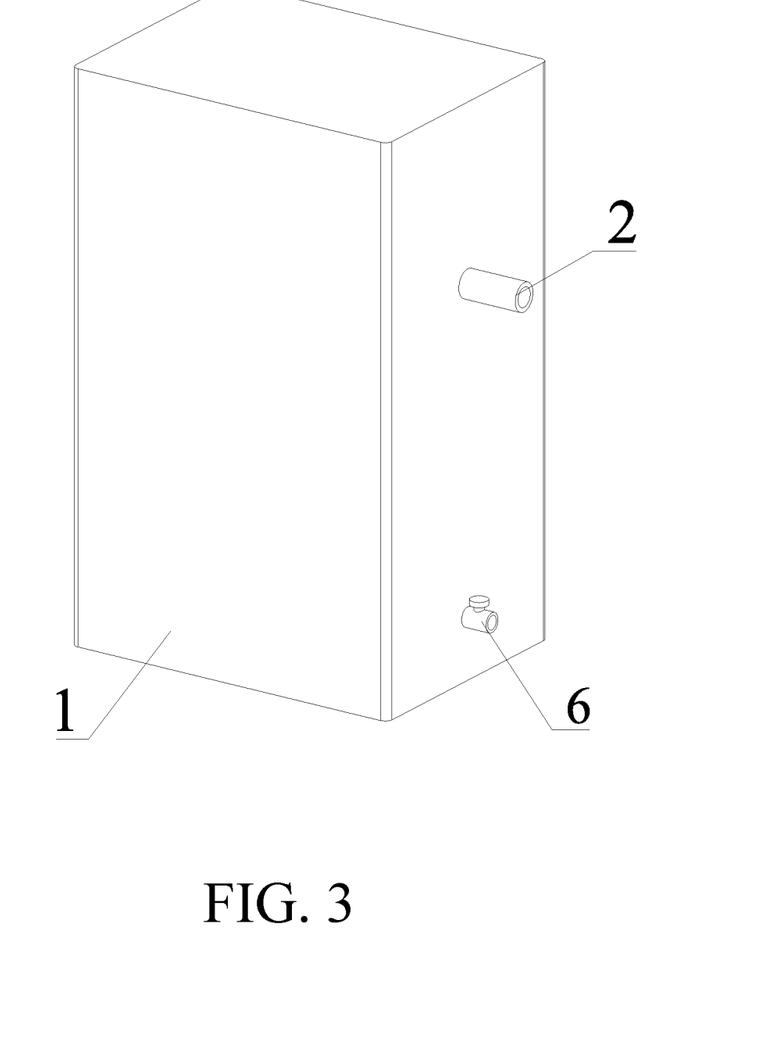
FIG. 3 is an overall schematic structural view of an online gas-in-oil monitoring apparatus for a vacuum OLTC according to the present disclosure.
Figure 4:
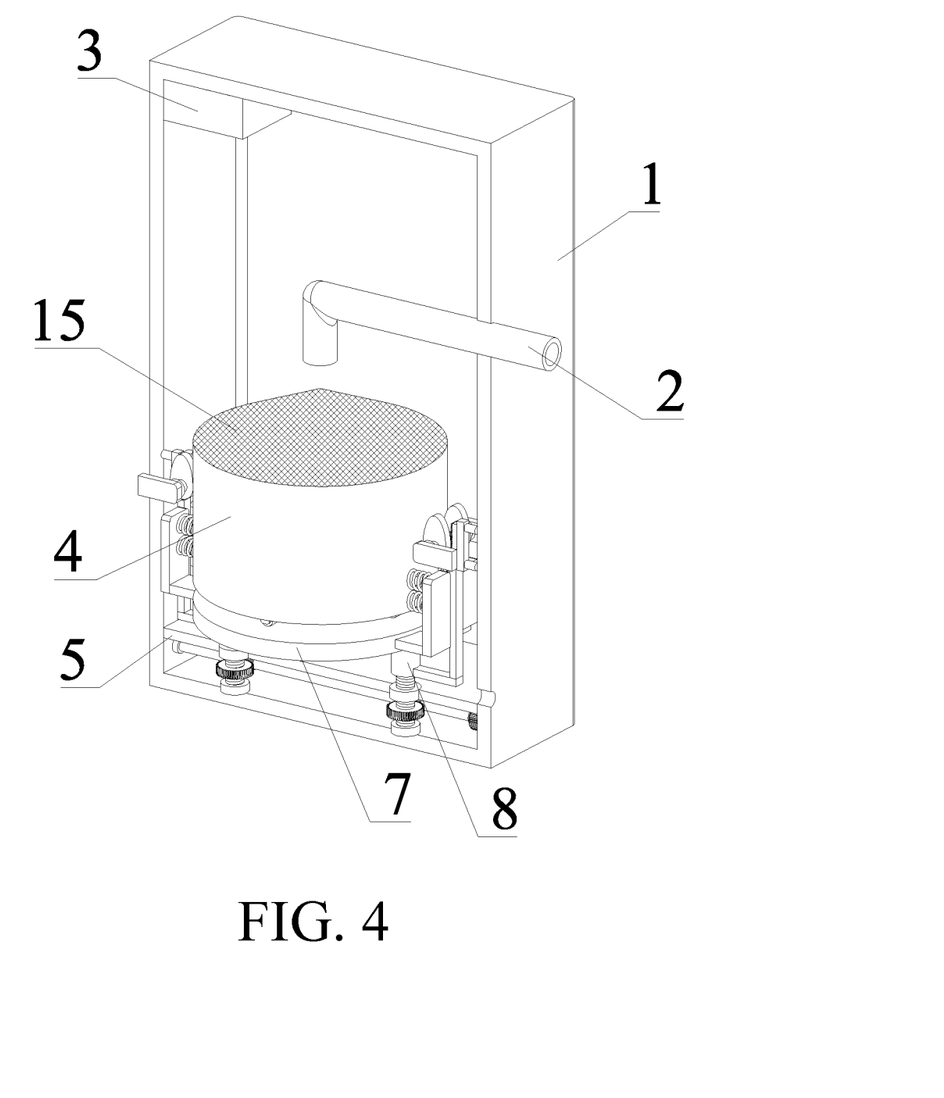
FIG. 4 is an internal schematic structural view of an online monitoring housing according to the present disclosure.

Test Results:

Referring to FIG. 2, it can be seen from test data at oil circulations of 1 h, 2 h, and 4 h that the degassing efficiency (namely the tested value of the gas/the offline concentration of the insulating oil) increases gradually over time, and when the degassing time lasts for 8 h or more, the degassing efficiency tends to be stable. Through analysis, in case of the short degassing time, there is 2 mL of 5-Kpa air in the gas chamber 208 (10 mL) of the degassing membrane tube to mix with the separated gas, thereby greatly diluting the gas. With the elapse of the time, the remaining air in the gas chamber (10 mL) of the degassing membrane tube is gradually replaced, and thus the tested value of the separated gas tends to be stable. It is indicated that the degassing efficiency increases gradually by prolonging the degassing time within a short time, and the degassing efficiency tends to be stable if the degassing time is long enough.

Embodiment 2

As shown in FIGS. 3-10, the present disclosure further provides an online gas-in-oil monitoring apparatus for a vacuum OLTC. The online gas-in-oil monitoring apparatus is provided with the above degassing membrane tube module, and includes an online monitoring housing 1, an oil inlet tube 2, a gas monitoring device 3, an oil tank 4, and an oil diffusing screen 15. The degassing membrane tube module is provided at a front end of the oil inlet tube 2, so as to perform online preliminary degassing on insulating oil.

Specifically, one end of the oil inlet tube 2 extends through an inner wall at one side of the online monitoring housing 1. The gas monitoring device 3 is located on a top inner wall of the online monitoring housing 1. The oil tank 4 is located in the online monitoring housing 1. The oil diffusing screen 15 is provided at a top of the oil tank 4. A support plate 5 is provided in the online monitoring housing 1. The support plate 5 is located below the oil tank 4. The support plate 5 is fixedly connected to inner walls of the online monitoring housing 1. An oil discharge tube 6 is provided at one side of the online monitoring housing 1. A support ring 7 is provided above the support plate 5. A bottom of the support ring 7 is fixedly connected to two threaded tubes 8. A vertical teetering mechanism 340 is provided at bottoms of the threaded tubes 8. The threaded tubes 8 are connected to the oil tank 4 through a horizontal striking component 90.

The horizontal striking component 90 includes connecting rods 9 symmetrically provided at two sides of the support ring 7. Bottoms of the connecting rods 9 are connected to the threaded tubes 8 through support rods 10. A top of each of the connecting rods 9 is fixedly connected to a toothed plate 11. A rotating shaft 12 is provided at one side of the toothed plate 11. A gear ring 13 is sleeved on the rotating shaft 12. The gear ring 13 is fixedly connected to the rotating shaft 12. Two cams 14 are sleeved on the rotating shaft 12. The cams 14 are fixedly connected to the rotating shaft 12. The rotating shaft 12 is connected to the inner wall of the online monitoring housing 1 through a support rotary piece 230. One side of the toothed plate 11 is connected to the inner wall of the online monitoring housing 1 through a stabilizing mechanism 190. The oil tank 4 is connected to the support ring 7 through an elastic support mechanism 250. A plurality of rollers 16 are arranged at a bottom of the oil tank 4. An oil discharge hole 17 is formed in the bottom of the oil tank 4. An opening-closing mechanism 280 is provided at the bottom of the oil tank 4.

Embodiment 3

Figure 9:
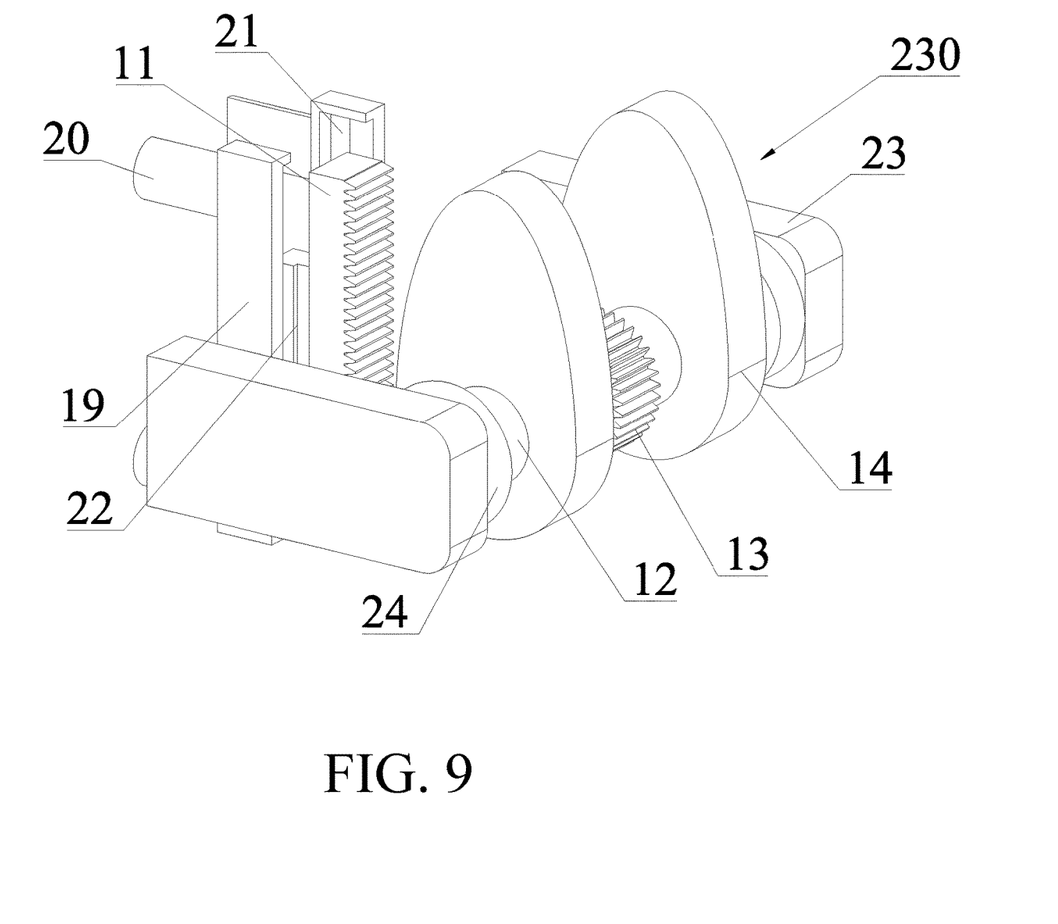
FIG. 9 is a schematic structural view of a stabilizing mechanism according to the present disclosure.
Figure 10:
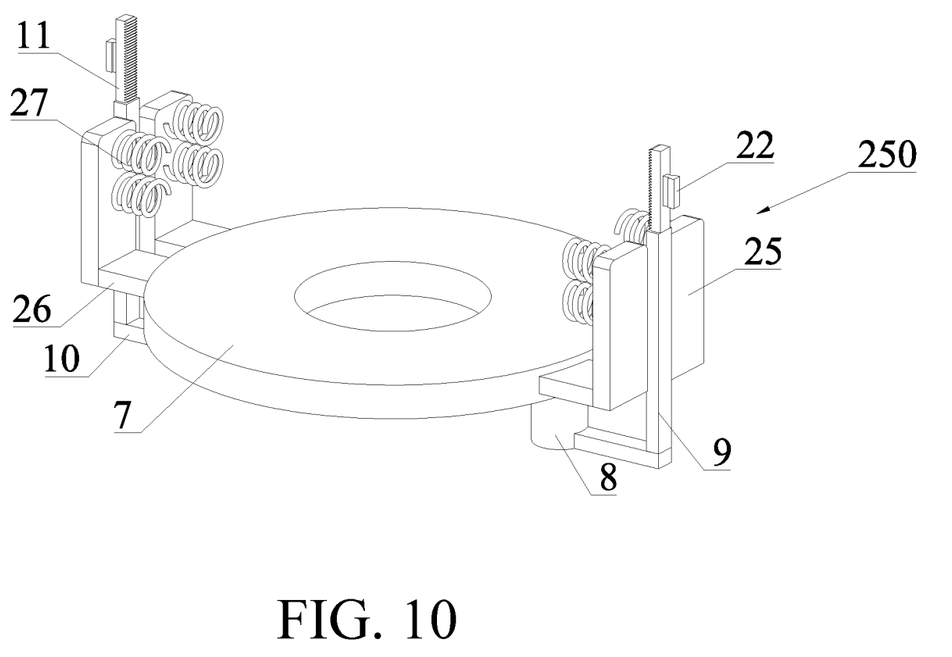
FIG. 10 is a schematic structural view of an elastic support mechanism according to the present disclosure.

On the basis of Embodiment 1, as shown in FIG. 9 and FIG. 10, the stabilizing mechanism 190 includes a fixed plate 19 at one side of the toothed plate 11. One side of the fixed plate 19 is connected to the inner wall of the online monitoring housing 1 through two support posts 20. A chute 21 is formed in one side of the fixed plate 19. A side of the toothed plate 11 closer to the fixed plate 19 is fixedly connected to a slider 22. The slider 22 is located in the chute 21. Both the chute 21 and the slider 22 have a T-shaped cross section. When the toothed plate 11 moves up and down, the slider 22 slides in the chute 21. With cooperation between the chute 21 and the slider 22, the toothed plate 11 moves up and down stably, and there are no inclination and teetering when the toothed plate 11 moves up and down.

Embodiment 4

On the basis of Embodiment 1, as shown in FIG. 5, FIG. 7, FIG. 9 and FIG. 10, the support rotary piece 230 includes first support side plates 23 symmetrically provided at two ends of the rotating shaft 12. One side of each of the first support side plates 23 is fixedly connected to the inner wall of the online monitoring housing 1. Two ends of the rotating shaft 12 are respectively connected to the two first support side plates 23 through first bearings 24. The elastic support mechanism 250 includes second support side plates 25 symmetrically provided at two sides of the oil tank 4. One side of each of the second support side plates 25 is connected to the support ring 7 through a connecting support plate 26. The second support side plates 25 are connected to the oil tank 4 through buffer springs 27. A bottom of each of the rollers 16 contacts a top of the support ring 7.

With the buffer springs 27, the oil tank 4 is elastically connected relative to the support ring 7. When the threaded tubes 8 drive the connecting rods 9 and the support rods 10 to move up and down, the toothed plate 11 moves up and down. As a result, through engagement between the gear ring 13 and the toothed plate 11, the rotating shaft 12 rotates, the cams 14 swing left and right, and the cams 14 strike the oil tank 4 periodically. While the oil tank 4 teeters up and down, the oil tank 4 shakes horizontally to achieve a more desirable vibration effect of the oil.

Embodiment 5

Figure 6:
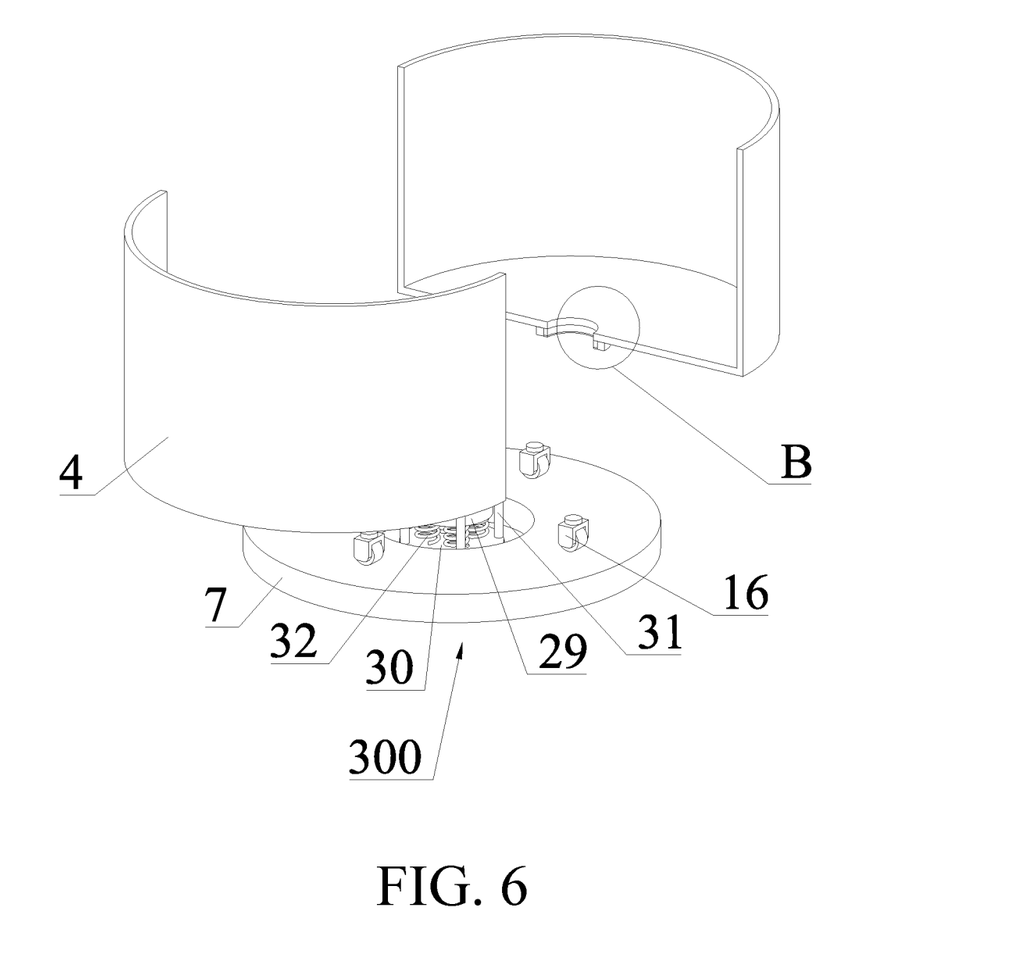
FIG. 6 is a schematic structural view of an opening-closing mechanism according to the present disclosure.
Figure 7:
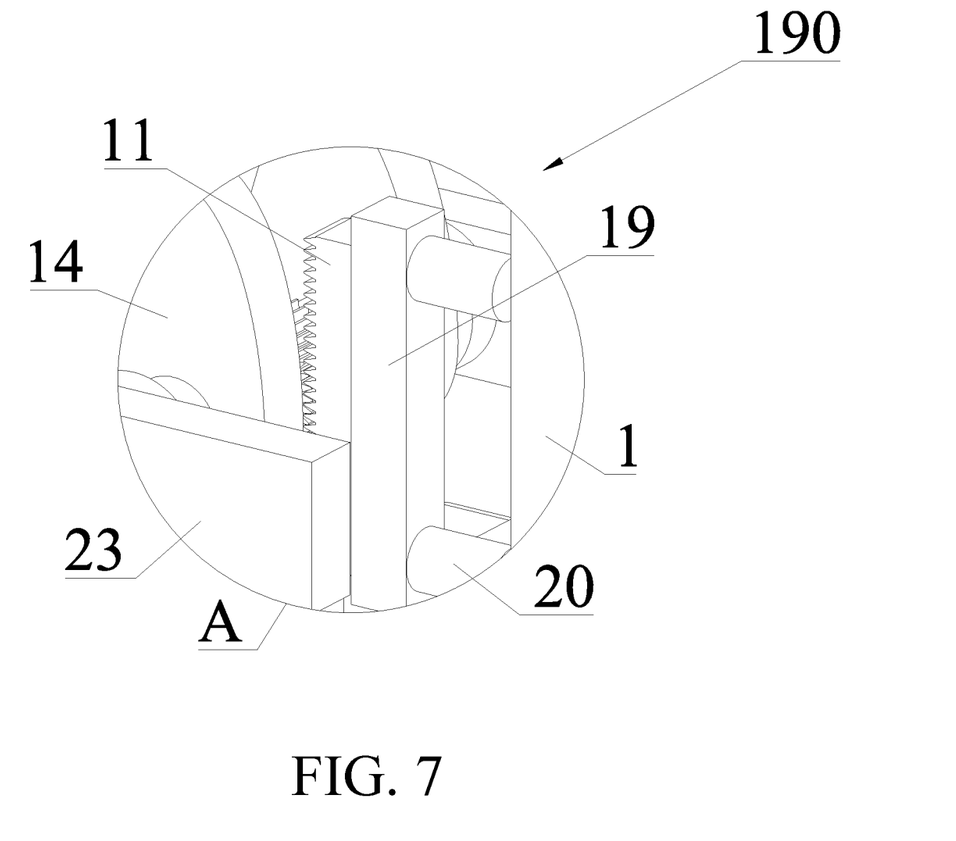
FIG. 7 is a schematic view illustrating an enlarged partial structure at A in FIG. 4.
Figure 8:
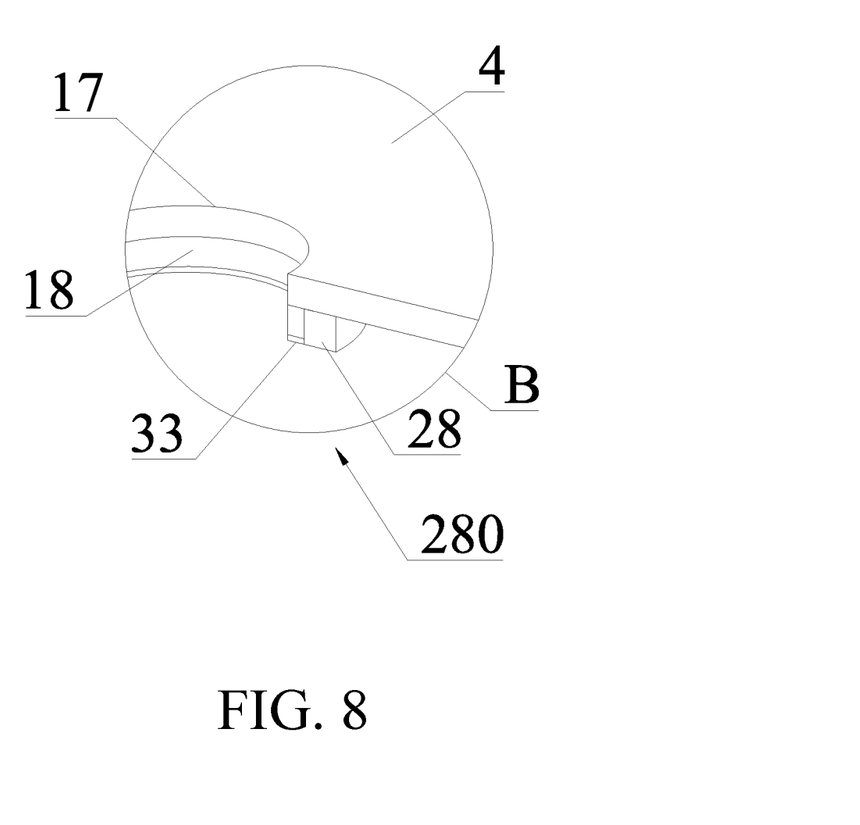
FIG. 8 is a schematic view illustrating an enlarged partial structure at B in FIG. 5.

On the basis of Embodiment 1, as shown in FIG. 6 and FIG. 8, the opening-closing mechanism 280 includes a fixed tube 18 above the support plate 5. A top of the fixed tube 18 is fixedly connected to the bottom of the oil tank 4. An iron ring 28 is sleeved on the fixed tube 18. A top of the iron ring 28 is fixedly connected to the bottom of the oil tank 4. An electromagnet 29 is provided at a bottom of the iron ring 28. The electromagnet 29 is connected to the oil tank 4 through a pulling buffer piece 300. The pulling buffer piece 300 includes a support disc 30 below the electromagnet 29. A top of the support disk 30 is connected to the bottom of the oil tank 4 through a plurality of connecting posts 31. A bottom of the electromagnet 29 is connected to the top of the support disk 30 through a plurality of tensile springs 32. A bottom of the fixed tube 18 is fixedly connected to a seal ring 33. A bottom of the seal ring 33 contacts a top of the electromagnet 29.

When there is a need to discharge the oil in the oil tank 4, the electromagnet 29 is turned off, such that the electromagnet 29 is not attracted with the iron ring 28. In this case, the tensile springs 32 are stretched, and the tensile springs 32 drive the electromagnet 29 to move down, such that the electromagnet 29 does not contact the bottom of the seal ring 33 to open the fixed tube 18. Consequently, the oil in the oil tank 4 flows out through the oil discharge hole 17 and the fixed tube 18. The oil flows to the top of the support plate 5, and flows out of the online monitoring housing 1 through the oil discharge tube 6. When there is a need to close the fixed tube 18, the electromagnet 29 is turned on, such that the electromagnet 29 is attracted with the iron ring 28 through a magnetic force, and the tensile springs 32 are stretched. Consequently, the electromagnet 29 contacts the seal ring 33 to close the fixed tube 18.

Figure 5:
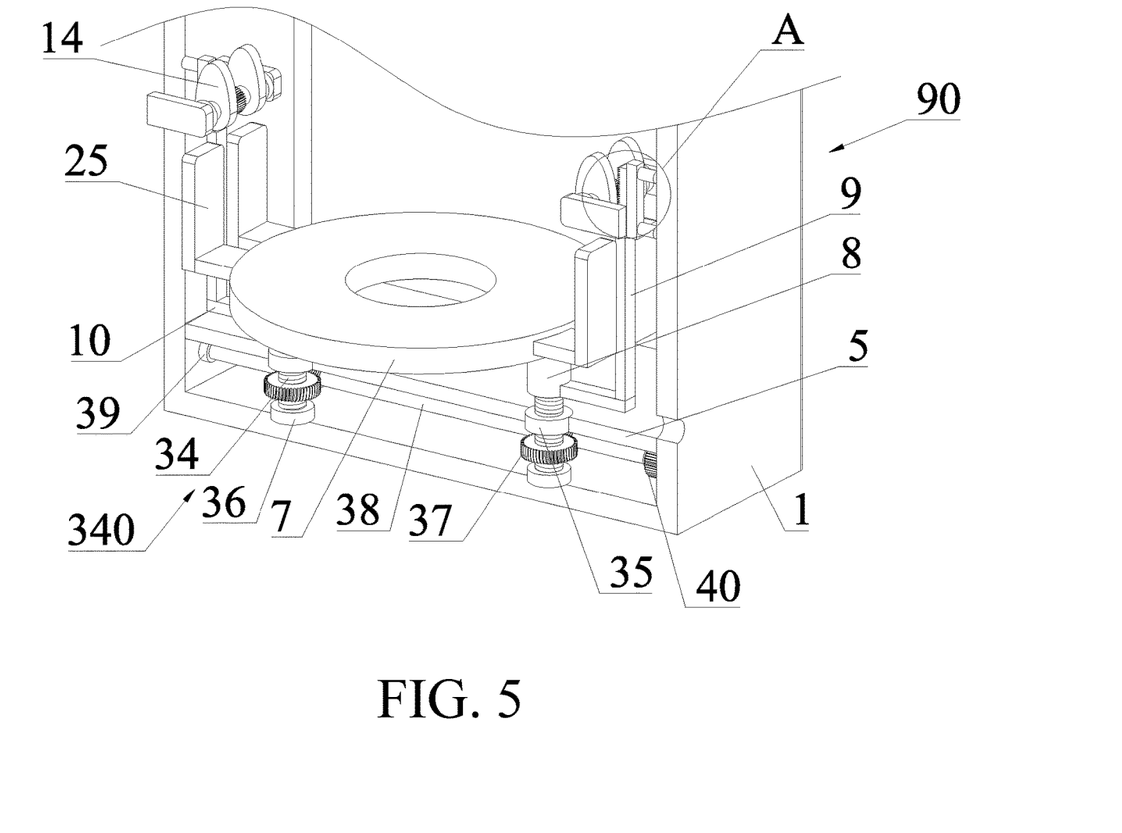
FIG. 5 is a schematic structural view of a vertical teetering mechanism according to the present disclosure.

On the basis of Embodiment 1, as shown in FIG. 5, the vertical teetering mechanism 340 in Embodiment 5 includes threaded posts 34 in the threaded tubes 8. The threaded posts 34 each extend through the support plate 5. Second bearings 35 are provided at places where the threaded posts 34 extend through the support plate 5. Bottom ends of the threaded posts 34 are connected to a bottom inner wall of the online monitoring housing 1 through third bearings 36. A worm 38 is provided below the support plate 5. The worm 38 includes one end connected to an inner wall at one side of the online monitoring housing 1 through a fourth bearing 39, and the other end connected to an inner wall at another side of the online monitoring housing 1 through a drive motor 40. A worm wheel 37 is sleeved on each of the threaded posts 34. The worm wheel 37 is engaged with the worm 38.

The drive motor 40 drives the worm 38 to rotate. Through engagement between the worm 38 and the worm wheel 37, the threaded posts 34 rotate. By changing lengths of the threaded posts 34 in the threaded tubes 8, heights of the threaded tubes 8 can be adjusted. By periodically driving the worm 38 to rotate normally and reversely, the threaded tubes 8 can teeter up and down relative to the support plate 5, and therefore, the support ring 7 and the oil tank 4 teeter up and down.

Working principles are as follows: When the online gas-in-oil monitoring apparatus works, the drive motor 40 drives the worm 38 to rotate. Through engagement between the worm 38 and the worm wheel 37, the threaded posts 34 rotate. By changing lengths of the threaded posts 34 in the threaded tubes 8, heights of the threaded tubes 8 can be adjusted. By periodically driving the worm 38 to rotate normally and reversely, the threaded tubes 8 can teeter up and down relative to the support plate 5, and therefore, the support ring 7 and the oil tank 4 teeter up and down, and the oil tank 4 is movably connected relative to the support ring 7. When the threaded tubes 8 drive the connecting rods 9 and the support rods 10 to move up and down, the toothed plate 11 moves up and down. As a result, through engagement between the gear ring 13 and the toothed plate 11, the rotating shaft 12 rotates, the cams 14 swing left and right, and the cams 14 strike the oil tank 4 periodically. While the oil tank 4 teeters up and down, the oil tank 4 shakes horizontally to achieve a more desirable vibration effect of the oil. When the toothed plate 11 moves up and down, the slider 22 slides in the chute 21. With cooperation between the chute 21 and the slider 22, the toothed plate 11 moves up and down stably, and there are no inclination and teetering when the toothed plate 11 moves up and down. When there is a need to discharge the oil in the oil tank 4, the electromagnet 29 is turned off, such that the electromagnet 29 is not attracted with the iron ring 28. In this case, the tensile springs 32 are stretched, and the tensile springs 32 drive the electromagnet 29 to move down, such that the electromagnet 29 does not contact the bottom of the seal ring 33 to open the fixed tube 18. Consequently, the oil in the oil tank 4 flows out through the oil discharge hole 17 and the fixed tube 18. The oil flows to the top of the support plate 5, and flows out of the online monitoring housing 1 through the oil discharge tube 6. When there is a need to close the fixed tube 18, the electromagnet 29 is turned on, such that the electromagnet 29 is attracted with the iron ring 28 through a magnetic force, and the tensile springs 32 are stretched. Consequently, the electromagnet 29 contacts the seal ring 33 to close the fixed tube 18.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

The invention claimed is:

1. An online gas-in-oil monitoring apparatus,
comprising an online monitoring housing (1), an oil inlet tube (2), a gas monitoring device (3), and an oil tank (4), wherein a front end of the oil inlet tube (2) is provided with a degassing membrane tube module, so as to perform online preliminary degassing on insulating oil;
the degassing membrane tube module is provided at a front end of the oil inlet tube (2), comprising an oil inlet (201) and an oil outlet (202) at two ends of the degassing membrane tube module, wherein an oil-gas separation membrane tube (210) and a housing (207) sleeved on the oil-gas separation membrane tube (210) are provided between the oil inlet (201) and the oil outlet (202); and a gas inlet (203) and a gas outlet (204) are threadedly connected to an outer wall of the housing (207); and a cavity enclosed by the oil inlet (201), the oil outlet (202), and the oil-gas separation membrane tube (210) forms an oil chamber (206) where the insulating oil flows; and a certain gap is reserved between the oil-gas separation membrane tube (210) and the housing (207) to form a gas chamber (208), such that gases separated from the insulating oil through the oil-gas separation membrane tube (210) are guided out, and exhausted by the gas outlet (204);

wherein one end of the oil inlet tube (2) extends through an inner wall at one side of the online monitoring housing (1); the gas monitoring device (3) is located on a top inner wall of the online monitoring housing (1); the oil tank (4) is located in the online monitoring housing (1); and an oil diffusing screen (15) is provided at a top of the oil tank (4); and a support plate (5) is provided in the online monitoring housing (1); the support plate (5) is located below the oil tank (4); the support plate (5) is fixedly connected to inner walls of the online monitoring housing (1); an oil discharge tube (6) is provided at one side of the online monitoring housing (1); a support ring (7) is provided above the support plate (5); a bottom of the support ring (7) is fixedly connected to two threaded tubes (8); a vertical teetering mechanism (340) is provided at bottoms of the threaded tubes (8); and the threaded tubes (8) are connected to the oil tank (4) through a horizontal striking component (90).

2. The online gas-in-oil monitoring apparatus according to claim 1, wherein the horizontal striking component (90) comprises connecting rods (9) symmetrically provided at two sides of the support ring (7); bottoms of the connecting rods (9) are connected to the threaded tubes (8) through support rods (10); a top of each of the connecting rods (9) is fixedly connected to a toothed plate (11); a rotating shaft (12) is provided at one side of the toothed plate (11); a gear ring (13) is sleeved on the rotating shaft (12); the gear ring (13) is fixedly connected to the rotating shaft (12); two cams (14) are sleeved on the rotating shaft (12); the cams (14) are fixedly connected to the rotating shaft (12); the rotating shaft (12) is connected to the inner wall of the online monitoring housing (1) through a support rotary piece (230); one side of the toothed plate (11) is connected to the inner wall of the online monitoring housing (1) through a stabilizing mechanism (190); the oil tank (4) is connected to the support ring (7) through an elastic support mechanism (250); a plurality of rollers (16) are arranged at a bottom of the oil tank (4); an oil discharge hole (17) is formed in the bottom of the oil tank (4); and an opening-closing mechanism (280) is provided at the bottom of the oil tank (4).

3. The online gas-in-oil monitoring apparatus according to claim 2, wherein the stabilizing mechanism (190) comprises a fixed plate (19) at one side of the toothed plate (11); one side of the fixed plate (19) is connected to the inner wall of the online monitoring housing (1) through two support posts (20); a chute (21) is formed in one side of the fixed plate (19); a side of the toothed plate (11) closer to the fixed plate (19) is fixedly connected to a slider (22); the slider (22) is located in the chute (21); and both the chute (21) and the slider (22) have a T-shaped cross section.

4. The online gas-in-oil monitoring apparatus according to claim 2, wherein the support rotary piece (230) comprises first support side plates (23) symmetrically provided at two ends of the rotating shaft (12), one side of each of the first support side plates (23) is fixedly connected to the inner wall of the online monitoring housing (1), and two ends of the rotating shaft (12) are respectively connected to the two first support side plates (23) through first bearings (24).

5. The online gas-in-oil monitoring apparatus according to claim 2, wherein the elastic support mechanism (250) comprises second support side plates (25) symmetrically provided at two sides of the oil tank (4); one side of each of the second support side plates (25) is connected to the support ring (7) through a connecting support plate (26); the second support side plates (25) are connected to the oil tank (4) through buffer springs (27); and a bottom of each of the rollers (16) contacts a top of the support ring (7).

6. The online gas-in-oil monitoring apparatus according to claim 2, wherein the opening-closing mechanism (280) comprises a fixed tube (18) above the support plate (5); a top of the fixed tube (18) is fixedly connected to the bottom of the oil tank (4); an iron ring (28) is sleeved on the fixed tube (18); a top of the iron ring (28) is fixedly connected to the bottom of the oil tank (4); an electromagnet (29) is provided at a bottom of the iron ring (28); the electromagnet (29) is connected to the oil tank (4) through a pulling buffer piece (300); the pulling buffer piece (300) comprises a support disc (30) below the electromagnet (29); a top of the support disk (30) is connected to the bottom of the oil tank (4) through a plurality of connecting posts (31); a bottom of the electromagnet (29) is connected to the top of the support disk (30) through a plurality of tensile springs (32); a bottom of the fixed tube (18) is fixedly connected to a seal ring (33); and a bottom of the seal ring (33) contacts a top of the electromagnet (29).

7. The online gas-in-oil monitoring apparatus according to claim 2, wherein the vertical teetering mechanism (340) comprises threaded posts (34) in the threaded tubes (8); the threaded posts (34) each extend through the support plate (5); second bearings (35) are provided at places where the threaded posts (34) extend through the support plate (5); and bottom ends of the threaded posts (34) are connected to a bottom inner wall of the online monitoring housing (1) through third bearings (36).

8. The online gas-in-oil monitoring apparatus according to claim 7, wherein a worm (38) is provided below the support plate (5); the worm (38) comprises one end connected to the inner wall at one side of the online monitoring housing (1) through a fourth bearing (39), and the other end connected to the inner wall at another side of the online monitoring housing (1) through a drive motor (40); a worm wheel (37) is sleeved on each of the threaded posts (34); and the worm wheel (37) is engaged with the worm (38).

* * * * *